United States Patent
Zhang et al.

(10) Patent No.: US 12,493,612 B2
(45) Date of Patent: *Dec. 9, 2025

(54) MECHANISMS FOR MAINTAINING CHAINS WITHOUT LOCKS

(71) Applicant: Salesforce, Inc., San Francisco, CA (US)

(72) Inventors: Rui Zhang, Fremont, CA (US); Prateek Swamy, Fremont, CA (US); Yi Xia, Los Angeles, CA (US); Punit B. Shah, Castro Valley, CA (US); Rama K. Korlapati, El Segundo, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,664

(22) Filed: Mar. 25, 2024

(65) Prior Publication Data

US 2024/0346013 A1  Oct. 17, 2024

Related U.S. Application Data

(63) Continuation of application No. 17/515,118, filed on Oct. 29, 2021, now Pat. No. 11,940,994.

(51) Int. Cl.
  *G06F 7/00* (2006.01)
  *G06F 16/23* (2019.01)
  *G06F 16/2455* (2019.01)
  *G06F 17/00* (2019.01)

(52) U.S. Cl.
  CPC .... *G06F 16/2379* (2019.01); *G06F 16/24552* (2019.01)

(58) Field of Classification Search
  None
  See application file for complete search history.

(56) References Cited

U.S. PATENT DOCUMENTS

| | | | |
|---|---|---|---|
| 10,120,577 B2 | 11/2018 | Muthukkaruppan et al. | |
| 10,242,050 B2 | 3/2019 | Agarwal et al. | |
| 10,535,368 B1 | 1/2020 | Dice et al. | |
| 2012/0323872 A1* | 12/2012 | Vasquez Lopez | G06F 16/172 707/704 |
| 2012/0331238 A1 | 12/2012 | McKenney | |
| 2015/0067658 A1* | 3/2015 | Hahnenberg | G06F 8/4443 717/148 |
| 2017/0160980 A1 | 6/2017 | Golander et al. | |
| 2018/0144061 A1* | 5/2018 | Rodriguez | G06F 16/9024 |
| 2018/0349621 A1* | 12/2018 | Schvey | H04L 9/3236 |
| 2021/0240697 A1 | 8/2021 | Rielau et al. | |

* cited by examiner

*Primary Examiner* — Tuan A Pham

(74) *Attorney, Agent, or Firm* — Kowert, Hood, Munyon, Rankin & Goetzel, P.C.; Mark D. Seegers; Dean M. Munyon

(57) ABSTRACT

Techniques are disclosed that relate to manipulating a chain of database objects without locking the chain. A computer system may maintain a chain that orders a set of database objects stored in a cache of the computer system. The computer system may receive a set of requests to perform database transactions. Based on those received set of requests, the computer system may determine to perform a plurality of chain operations that involve modifying the chain. The computer system may perform two or more of the plurality of chain operations at least partially in parallel using a set of atomic operations without acquiring a lock on the chain.

19 Claims, 9 Drawing Sheets

US 12,493,612 B2

MECHANISMS FOR MAINTAINING CHAINS WITHOUT LOCKS

PRIORITY CLAIM

The present application is a continuation of U.S. application Ser. No. 17/515,118, entitled "MECHANISMS FOR MAINTAINING CHAINS WITHOUT LOCKS," filed Oct. 29, 2021; the disclosure of which is incorporated by reference herein in its entirety.

BACKGROUND

Technical Field

This disclosure relates generally to database systems and, more specifically, to various mechanisms for manipulating a chain of database objects without locking the chain.

Description of the Related Art

Enterprises routinely implement database management systems (or, simply "database systems") that enable users to store a collection of information in an organized manner that can be efficiently accessed and manipulated. During operation, a database system receives requests from users via applications (e.g., an application server) or from other systems, such as another database system, to perform transactions. When performing a transaction, the database system often reads requested data from a database whose data is stored by a storage service and writes data back to the database. If the transaction includes a request for certain data, then the database system returns that data to the requestor in a response to the transaction request, assuming that the data is present in the database. In some implementations, the database system locally stores a set of database objects that can enable the database system to more effectively and efficiently carry out the operations of the database service.

DETAILED DESCRIPTION

Figure 1:
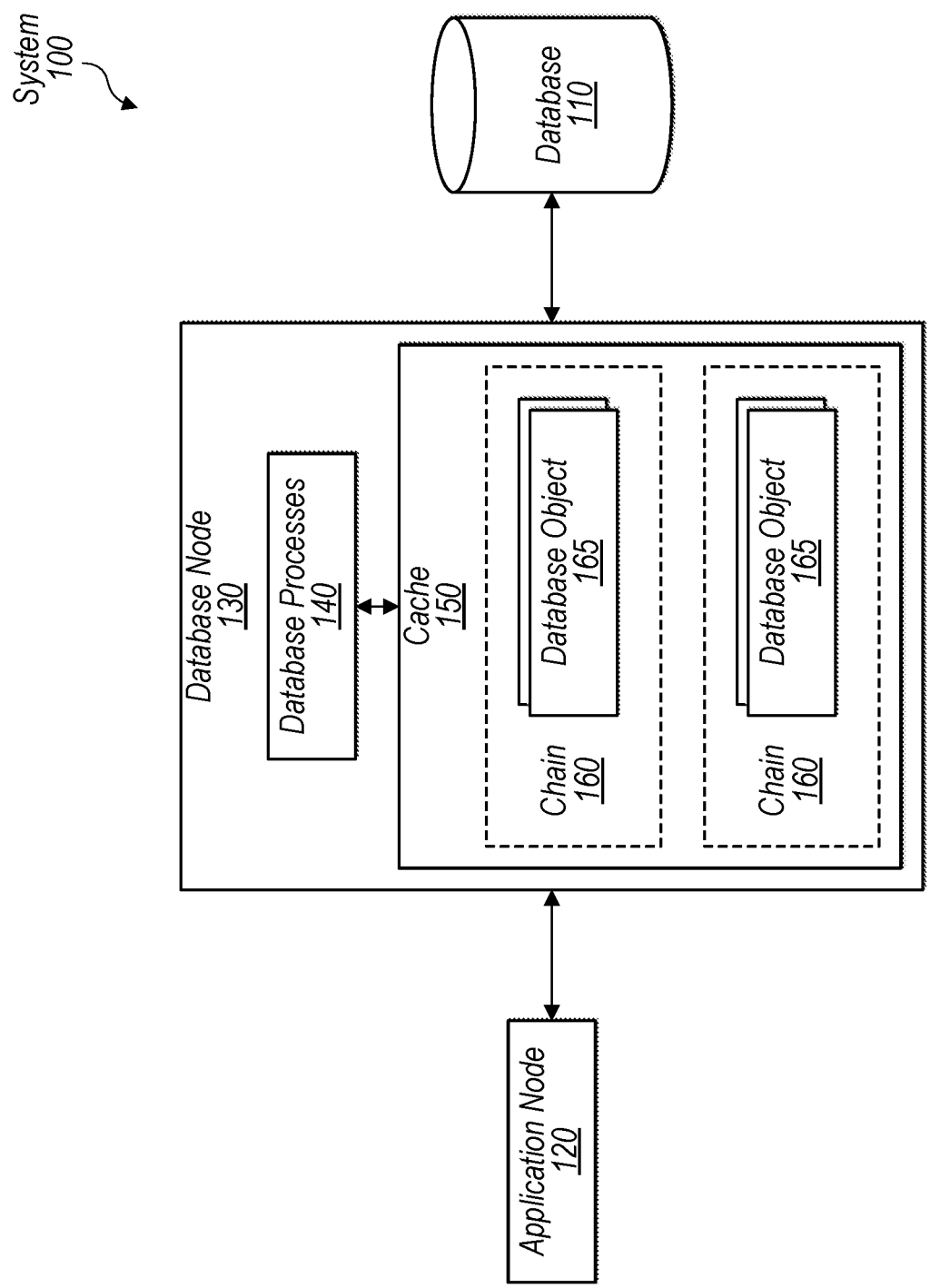
FIG. 1 is a block diagram illustrating example elements of a system having a database, a database node, and an application node, according to some embodiments.

A database system is routinely used to manage data, including accessing, manipulating, and storing that data. In some implementations, the database system maintains a set of database objects that enable the database system to more effectively and efficiently provide its database services. Two example types of those database objects are query plans and functions. A query plan (or query execution plan) defines a sequence of steps to be performed by a database system to execute a query on data of a database. When a query is submitted to a database system, the database system may evaluate different possible query plans for executing that query and then carry out the selected query plan. Query plans are typically used to optimize and improve the execution of queries. A user-defined function specifies a set of operations that a user seeks to perform in relation to data of the database. As an example, a user may provide a function that calculates the average value for a field of a set of records returned for an executed query. To execute a function (or a query plan), a definition of that function has to be located, loaded into memory, and then compiled into a form that can be executed by a process of the database system. That compilation is fairly resource-intensive, the effects of which are compounded by the fact that these database objects may be used often. In order to reduce the resource costs, in some implementations, once a database object has been prepared, the executable form of that database object is stored within a shared cache accessible to various processes of the database system. If a given process wishes to use a database object, the process can access it from the shared cache (if it has been stored there) instead of spending resources to compile it again.

In many cases, the shared caches (e.g., one for functions and one for query plans), are of limited size. As a result, in order to add a database object to a shared cache when the cache has become full, another database object already present within the shared cache has to be evicted to make room for the incoming database object. In some implementations, a least recently used (LRU) policy is employed to select candidates for eviction and it can take the form of an LRU chain that links together the database objects present in the shared cache. The head of the chain corresponds to the most recently used database object and the tail of the chain corresponds to the least recently used database object. When the shared cache is full and a new database object is being inserted, the database object residing at the tail of the chain is evicted while the new database object is added at the head of the chain. These operations of adding a database object and evicting a database object both traditionally involve locking the chain in order to complete the operations. When multiple processes are trying to alter the chain, there can be a significant performance penalty as many of those processes spend time waiting to acquire the lock on the chain as only a single process can exclusively lock the chain. This present disclosure addresses, among other things, the problem of how to allow for multiple processes to manipulate a chain (e.g., by adding and evicting database objects in parallel) without having to acquire locks on the chain.

In various embodiments described below, a system includes a database, an application node, and a database node that executes database processes to service transaction requests from the application node to perform database operations on data stored within the database. During operation, the database node may access definitions for database objects (e.g., query plans), compile them into an executable form, and store the database objects (in the executable form) within a shared cache accessible to the database processes executing on the database node. The database node also maintains a set of chains, each of which orders a set of database objects stored in the cache. As part of processing transaction requests, database processes may manipulate a chain to insert or evict database objects from the chain.

Instead of those database processes locking the chain in turn, in various embodiments, the database processes execute a set of atomic operations in a manner that prevents them from conflicting with each other so that the consistency and integrity of the chains are maintained. As used herein, the phrase "atomic operation" (or, performing a set of operations together "atomically") is used in accordance with its well-understood meaning and refers to a set of actions that are performed within a single step such that an outside observer cannot inject another action (e.g., as a result of a processor context switch) between the set of actions. One example of an atomic operation is a compare-and-swap (CAS) operation in which two values are compared and then one of them is swapped with a third value if those two values match (or do not match, in certain implementations). The comparison operation and the swap operation are performed by a database process such that another database process cannot inject an operation between those two operations. In various cases, an atomic operation is facilitated using a specialized hardware instruction (e.g., the CAS operation could be implemented by the cmpxchg instruction in the Intel® instruction set). The specialized hardware instruction may be invoked via a particular function of a high-level programming language and a compiler may be designed to replace that function with the hardware instruction.

There are various scenarios in which multiple database processes attempt to modify the same chain: multiple processes evicting database objects, multiple processes inserting database objects, and multiple processes concurrently evicting and inserting database objects. In various embodiments, for the first scenario, a given chain is associated with an eviction status flag that is used to indicate whether a process is already performing an eviction on that chain. As such, when a process is going to perform an eviction on a chain, the process uses an atomic operation to check the flag to determine if it has been set and then sets the flag if it has not been set. Once the flag is set, other processes may not perform eviction operations on the chain. For the second scenario, in various embodiments, a process performs at least two atomic operations: an atomic operation to read the database object located at the current head position of the chain so that the new database object being inserted may be prepared and then an atomic operation to set the new database object as the new head of the chain, immediately preceding the previously obtained head object. For the third scenario, in various embodiments, the evicting process performs an atomic operation to read the head database object and then evicts database objects up to the head database object. Because the evicting process may not evict that head database object (or beyond that head database object, in various embodiments), the evicting process may not conflict with an inserting process. Atomic operations may further be used in cases in which a chain is empty or has a single database object in order to prevent conflicts between processes that are inserting and evicting concurrently.

These techniques may be advantageous as they allow a chain of database objects to be manipulated by multiple processes at least partially in parallel without each process having to exclusively lock the chain. That is, in prior approaches, database processes that sought to evict or add database objects had to acquire exclusive access to the chain by locking it in an exclusive mode. That exclusive mode prevented other processes from modifying the chain and thus they had to wait until the chain was unlocked by the process that locked the chain. By using atomic operations, the present techniques allow a chain to be modified concurrently without the chain being locked and thus database processes may spend less time idle, improving the operation of the system. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software. As shown within the illustrated embodiment, system 100 includes a database 110, an application node 120, and a database node 130. As further shown, database node 130 includes database processes 140 and a cache 150 storing database objects 165 that are a part of a set of chains 160. In some embodiments, system 100 is implemented differently than illustrated. For example, system 100 might include multiple application nodes 120 and/or database nodes 130, chains 160 might be stored outside of cache 150 while the corresponding database objects 165 are stored within cache 150, and/or there may be multiple caches 150 each with their own chain 160.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases (e.g., database 110), and other entities of system 100. In various embodiments, system 100 is implemented using a cloud infrastructure that is provided by a cloud provider. Database 110, application node 120, and database node 130 may thus execute on and utilize the available cloud resources of that cloud infrastructure (e.g., computing resources, storage resources, network resources, etc.) to facilitate their operation. For example, database node 130 may execute in a virtual environment that is hosted on server-based hardware included within a datacenter of the cloud provider. But in some embodiments, system 100 is implemented utilizing a local or private infrastructure as opposed to a public cloud.

Database 110, in various embodiments, is a collection of information that is organized in a manner that allows for access, storage, and manipulation of that information. Accordingly, database 110 may include supporting software (e.g., storage nodes) that enable database node 130 to carry out operations (e.g., accessing, storing, etc.) on the information stored at database 110. In various embodiments, database 110 is implemented using a single or multiple storage devices that are connected together on a network (e.g., a storage attached network (SAN)) and configured to redundantly store information in order to prevent data loss. The storage devices may store data persistently and thus database 110 may serve as a persistent storage for system 100. In various embodiments, data written to database 110 by a database node 130 is accessible to other database nodes 130 within a multi-node configuration. The data may include database records that comprise key-value pairs having data and a corresponding key that can be used to look up the database record. For example, a database record may correspond to a data row in a database table and specify values for one or more attributes/fields of that table. One or more of the attributes/fields may also be used to define a key for accessing that record from database 110.

Application node 120, in various embodiments, facilitates the execution of one or more applications that perform various functions and tasks, including interfacing with database node 130. In various embodiments, application node 120 is software that is executable on hardware, while in some embodiments, it encompasses both the hardware and the software. Examples of applications that may be implemented by application node 120 include a customer relationship management (CRM) service, a content streaming service, an email service, and a user-provided application (as opposed to an application provided by a provider of system 100). An application implemented by application node 120 may provide services to multiple tenants over a wide-area network, such as the Internet, and may be hosted on or as part of a cloud service. In various embodiments, application node 120 interfaces with database node 130 to enable tenants to store and access their data at database 110. Application node 120 may establish database connections with database node 130 (e.g., using an API, such as Java Database Connectivity) through which transaction requests can be issued to database node 130. In various embodiments, a transaction request specifies a set of database statements (e.g., SQL statements) to be executed by database node 130.

Database node 130, in various embodiments, provides database services, such as data storage, data retrieval, and/or data manipulation. In various embodiments, database node 130 is software that is executable on hardware, while in some embodiments, it encompasses both the hardware and the software. The database services may be provided to components within system 100 and/or external to system 100. For example, as mentioned, database node 130 may receive a transaction request from application node 120 to perform a database transaction. A database transaction, in various embodiments, is a logical unit of work (e.g., a specified set of database operations) to be performed in relation to database 110. As an example, processing a database transaction may include executing a SQL SELECT command to select one or more rows from one or more tables. The contents of a row may be specified in a database record and therefore database node 130 may return one or more database records that correspond to those one or more rows. Performing a database transaction can include database node 130 writing database records to database 110. Database node 130, in various embodiments, initially writes records to an in-memory cache before later flushing them to database 110 after they have been committed. As used herein, the phrase "committing a transaction" (or, "committing a record") is used in accordance with its well-understood meaning and refers to the process of causing the changes made during the transaction to be saved and made visible outside of the entity that performed the transaction.

Database processes 140, in various embodiments, are computer processes that execute to provide the various database services of database node 130. A database process 140 may be instantiated to handle a transaction request passed in by application node 120 via an established database connection. As part of handling the transaction request, the database process 140 may execute a set of database statements specified in that request. In order to execute those database statements, in various embodiments, the database process 140 executes a query execution plan that defines a sequence of steps to be executed in order to fulfill the database statements. Thus, the database process 140 may access a definition for the query execution plan (e.g., at database 110), compile it into a form that can be executed by the database process 140, and then execute the compiled form. In some cases, as part of handling a transaction request, a database process 140 might execute a user-defined function to perform a desired operation. In a similar manner to query plans, the database process 140 may access a definition of the user-defined function, compile it into an executable form, and execute it. In various embodiments, a database process 140 includes the executable form of the query plan or user-defined function in a database object 165 and caches that database object 165 in cache 150.

Cache 150, in various embodiments, is a buffer that stores data in memory (e.g., random access memory) of database node 130. Cache 150 may be located within a shared memory area designated by an operation system executing on database node 130. In various embodiments, cache 150 is shared among database processes 140 and therefore once a database object 165 is stored in cache 150 by one database process 140, other database processes 140 may access that database object 165 and execute its query plan or function. As a result, a query plan or function that is usable in multiple database transactions may not have to be recompiled for each of those transactions. That is, caching database objects 165 created during compilation, allows for reuse of the database objects 165 and avoids the cost of recompiling them. While a single cache 150 is illustrated, in various embodiments, there are at least two separate caches 150: one for storing database objects 165 having query plans and one for storing database objects 165 having user-defined functions. An example chain 160 is discussed in more detail with respect to FIG. 2.

During operation, cache 150 may become full or almost full and thus have no available capacity to cache more database objects 165. Accordingly, in various embodiments, database processes 140 perform maintenance routines on cache 150 in order to evict database object 165 from cache 150 to make space to accommodate other database objects 165. To determine which database objects 165 to evict, database processes 140 make use of chains 160. A chain 160, in various embodiments, is a data structure that orders a set of database objects 165 stored within cache 150. A chain 160 may be implemented as a least recently used (LRU) chain that orders database objects 165 such that the head of the chain 160 corresponds to the most recently used database object 165 and the tail of the chain 160 corresponds to the least recently used database object 165 of that chain 160. Consequently, in various embodiments, database processes 140 modify a chain 160 by inserting database objects 165 at the head of the chain 160 and evicting database objects 165 from the tail of the chain 160. In some instances, when a database process 140 seeks to insert a database object 165 but cache 150 is full, that database process 140 may first perform an eviction procedure on the associated chain 160 and then perform the insertion procedure to insert that database object 165.

In some cases, multiple database processes 140 may attempt to modify a chain 160 at relatively the same time. In order to prevent issues with concurrent operations on a chain 160, in various embodiments, database processes 140 execute a set of atomic operations that allow for concurrent modification of the chain 160 without those database processes 140 having to take turns locking that chain 160. An example interaction in which multiple database processes 140 seek to perform eviction operations on chains 160 is discussed with respect to FIG. 3. An example interaction in which a database process 140 performs an insertion operation on a chain 160 in a manner that allows for multiple database processes 140 to insert database objects 165 is discussed with respect to FIG. 4. And an example interaction in which a database process 140 performs an insertion operation on a chain 160 and another database process 140 performs an eviction operation concurrently on the same chain 160 is discussed with respect to FIG. 5.

Figure 2:
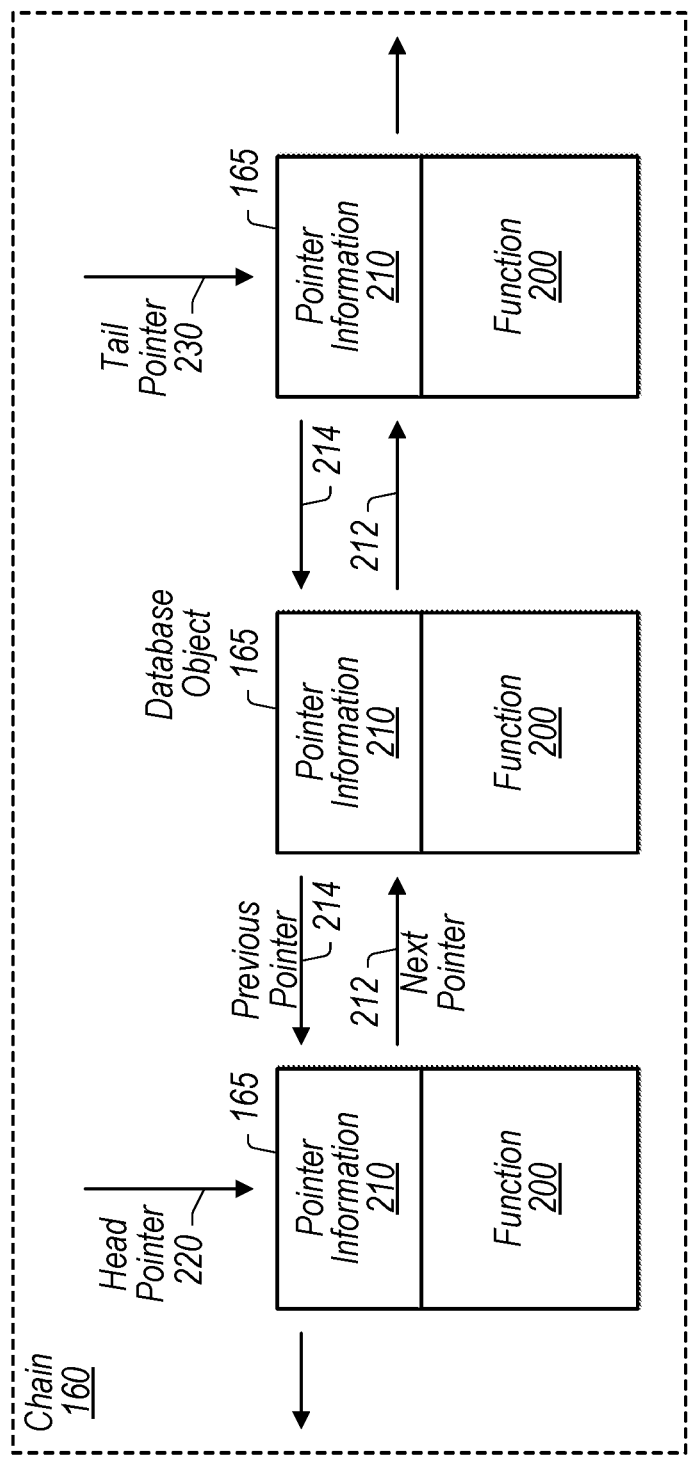
FIG. 2 is a block diagram illustrating example elements of a chain that orders a set of database objects, according to some embodiments.

Turning now to FIG. 2, a block diagram of an example chain 160 is depicted. As shown in the illustrated embodiment, chain 160 includes a set of database objects 165 linked together, a head pointer 220, and a tail pointer 230. As further shown, those database objects 165 include a respective payload, in this case shown as a function 200 and pointer information 210. In some embodiments, chain 160 may be implemented differently than shown. For example, chain 160 may include database objects 165 having query plans or another database construct, or chain 160 may include a combination of functions 200 and query plans.

As explained, chain 160 may be implemented as a least recently used (LRU) chain. In order to identify the beginning and the ending of chain 160, in various embodiments, chain 160 includes head pointer 220 and tail pointer 230 that point to the head and tail database objects 165 within chain 160, respectively. Head pointer 220 and tail pointer 230 may specify, for a corresponding database object 165, a memory address of that database object 165 within cache 150. In various embodiments, when a database object 165 is inserted into cache 150 and being added to chain 160, a database process 140 updates head pointer 220 to point to that database object 165. As explained in more detail below, a database process 140 may ensure that certain criteria are met before updating head pointer 220. In various embodiments, when a database object 165 is being evicted from cache 150 and chain 160, a database process 140 updates tail pointer 230 to point to the next database object 165 at the tail end of chain 160. Also as explained further below, a database process 140 may ensure that certain criteria are met before updating tail pointer 230. In many cases, updating head pointer 220 and tail pointer 230 may involve pointer information 210 of database objects 165.

As depicted, a database object 165 can include a function 200 and pointer information 210. A function 200, in various embodiments, is a user-defined function executable to perform a specified set of operations. While database objects 165 are shown as including functions 200, in some embodiments, a given database object 165 includes a pointer to a location within cache 150 where a corresponding function 200 is stored. Likewise for a query plan, a database object 165 may include a pointer to a location of the query plan within cache 150. Pointer information 210, in various embodiments, includes a next pointer 212 identifying the next database object 165 in the direction of the tail of chain 160 and a previous pointer 214 identifying the previous database object 165. When a database object 165 is initially being added to chain 160, its next and previous pointers 212 and 214 may be originally null. Next and previous pointers 212 and 214 may enable database processes 140 to traverse chain 160 in both directions and thus chain 160 may be a doubly linked list. For example, a database process 140 performing evictions on chain 160 may use previous pointers 214 to traverse chain 160 backwards so that it may evict database objects 165 in order from least recently used to most recently used.

Figure 3:
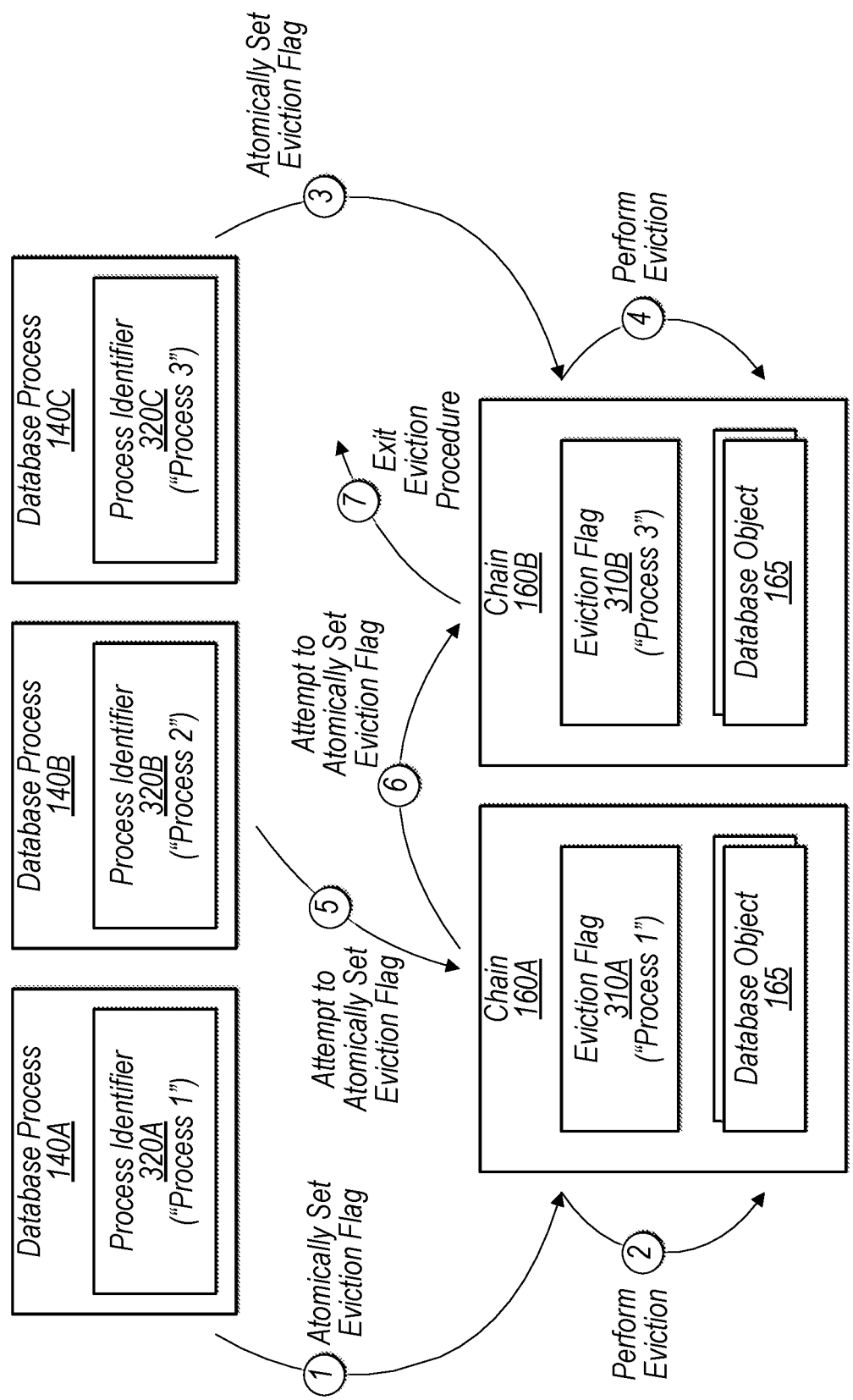
FIG. 3 is a block diagram illustrating an example interaction in which multiple database processes seek to perform eviction operations on chains, according to some embodiments.

Turning now to FIG. 3, a block diagram of an example interaction in which multiple database processes 140 seek to perform eviction operations on a set of chains 160 is shown. In the illustrated embodiments, there are three database processes 140A-C and two chains 160A-B having database objects 165. As further depicted, database processes 140A-C are associated with process identifiers 320A-C, respectively, and chains 160A-B include eviction flags 310A-B, respectively. The illustrated embodiment may be implemented differently than shown. For example, eviction flags 310 may not be set to correspond to process identifiers 320 of database processes 140.

In some cases, a database process 140 may evict database objects 165 from a chain 160 at a sufficient rate such that it may be desirable to only have one database process 140 perform evictions on a given chain 160. To avoid multiple database processes 140 performing evictions on a chain 160, in various embodiments, a chain 160 includes an eviction flag 310 that indicates whether a database process 140 is already performing an eviction operation on that chain 160. The eviction flag 310 may be initialized to a default value. In various cases, that default value is zero. When a database process 140 wishes to perform a set of eviction operations on a chain 160, in various embodiments, that database process 140 performs an atomic operation (e.g., an atomic CAS operation) on the eviction flag 310 of the chain 160 to set the eviction flag 310 to indicate that the database process 140 is going to perform the set of eviction operations. If the atomic operation is successful, then that database process 140 proceeds with the set of eviction operations. In particular, the database process 140 may perform an atomic CAS operation in which the value of the eviction flag 310 of the chain 160 is compared to the default value (e.g., zero) and, if there is a match, then the eviction flag 310 is set to a different value (e.g., a non-zero value, such as the process identifier 320 of that database process 140). Since the eviction flag 310 is not set to the default value, in various embodiments, other database processes 140 that perform the atomic CAS operation will not succeed (a mismatch for the comparison) and thus those database process 140 will not be able to perform eviction operations on that chain 160. Once a database process 140 has completed its eviction operations, the eviction flag 310 may be reset by that database process 140 back to the default value (e.g., zero) with an atomic write operation.

As shown for example, of database processes 140A-C, database process 140A initially seeks to perform a set of eviction operations on chain 160A. Eviction flags 310A-B may be set to a default value, such as zero. Prior to performing those eviction operations, database process 140A first attempts to atomically set eviction flag 310A by executing an atomic CAS operation. In the illustrated embodiment, the atomic CAS operation succeeds and eviction flag 310A is set to the value of process identifier 320A of database process 140A (i.e., "Process 1"). Database process 140A then proceeds to evict one or more database objects 165 from chain 160A. In a similar manner, database process 140C next seeks to perform a set of eviction operations on chain 160B and initially attempts to atomically set eviction flag 310B by executing an atomic CAS operation. In the illustrated embodiment, the atomic CAS operation succeeds and eviction flag 310B is set to the value of process identifier 320B of database process 140C (i.e., "Process 3"). Database process 140C proceeds to evict one or more database objects 165 from chain 160B. Afterwards, database process 140B seeks to perform a set of eviction operations on chain 160A and thus attempts to atomically set eviction flag 310A by executing an atomic CAS operation. In the illustrated embodiment, however, the atomic CAS operation fails because eviction flag 310A has been set to the value "Process 1" and thus does not match the default value.

If a database process 140 is usable to perform eviction operations on a particular chain 160, in various embodiments, the database process 140 attempts to perform eviction operations another chain 160. The database process 140 may continue to search for a chain 160 until one is found on which eviction operations can be performed. If there is no chain 150 available for the database process 140 to perform the eviction operations, then the database process 140 may exit the eviction procedure. Continuing the previous example, database process 140B proceeds to attempt to perform a set of eviction operations on chain 160B and thus attempts to atomically set eviction flag 310B by executing an atomic CAS operation. Because eviction flag 310B has been set to the value "Process 3" and thus does not match the default value, the atomic CAS operation fails. Since there are no other chains 160 in the illustrated embodiment, database process 140B exits the eviction procedure. In the event that an error occurs during the eviction procedure, in various embodiments, the executed error-handling logic ensures that an eviction flag 310 set previously by the eviction procedure is reset to the default value.

Figure 4:
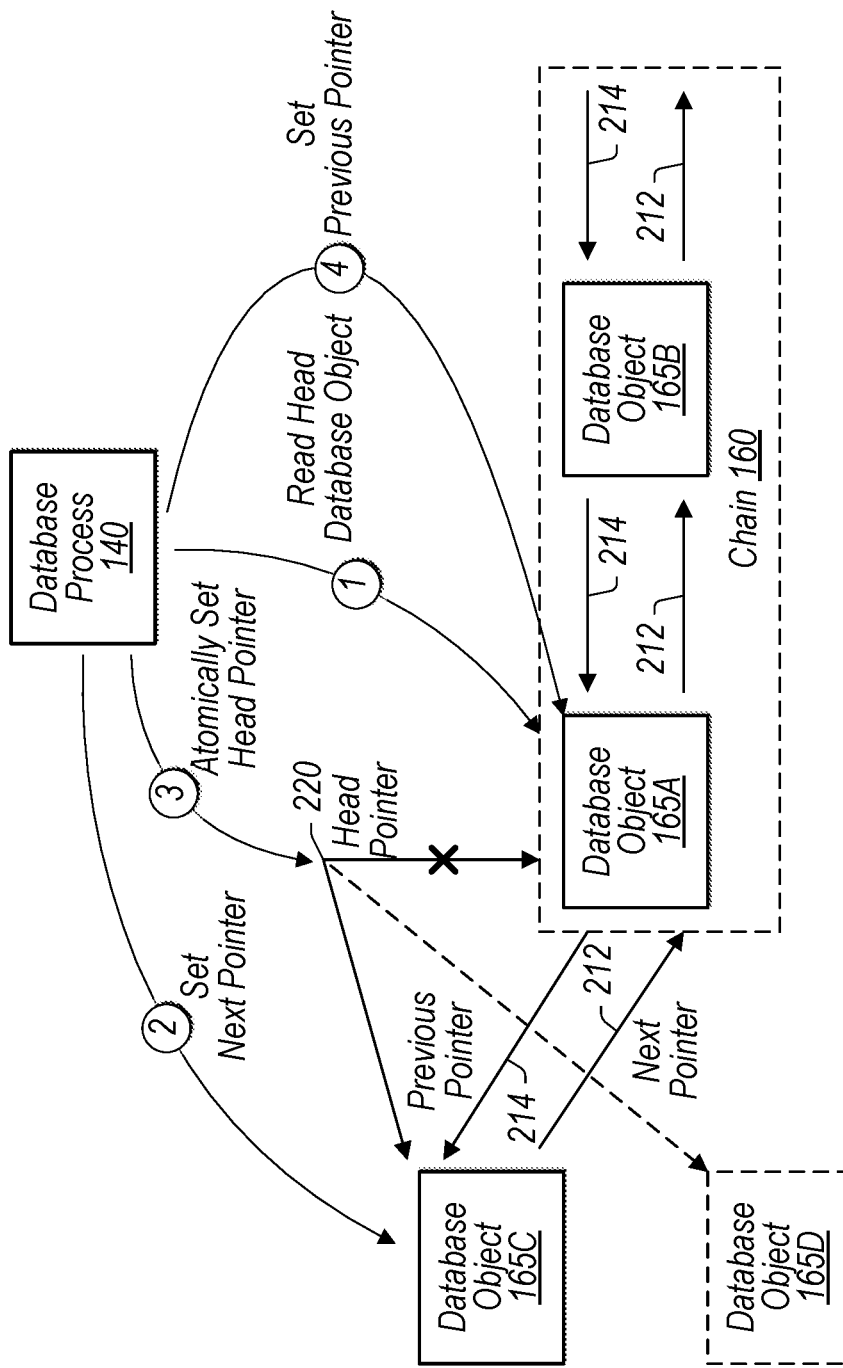
FIG. 4 is a block diagram illustrating an example interaction in which a database process performs an insertion operation on a chain, according to some embodiments.

Turning now to FIG. 4, a block diagram of an example interaction in which a database process 140 performs an insertion operation to insert a database object 165 into a chain 160 is shown. In the illustrated embodiment, there is a database process 140 and a chain 160 having database objects 165A and 165B. As further illustrated, head pointer 220 of chain 160 initially identifies database object 165A as the head of chain 160. The illustrated embodiment may be implemented differently than shown. As an example, chain 160 may be empty and, as a result, head pointer 220 may initially be set to a null value.

When inserting a database object 165 into chain 160, a set of atomic operations may be executed in order to ensure consistency in the modification of chain 160 in view of the potential of multiple database processes 140 modifying chain 160 in parallel. Before inserting database object 165C, the next pointer 212 and the previous pointer 214 of database object 165C may initially be set to null. When inserting database object 165C, in various embodiments, database process 140 performs an atomic read using head pointer 220 to obtain the head database object 165 of chain 160. In the illustrated embodiment for example, database process 140 determines that database object 165A is the head database object 165 of chain 160. Database process 140 may then atomically set the next pointer 212 of database object 165C to point to database object 165A. By setting a database object 165's next pointer 212 to point to the head database object 165 of a chain 160 before updating head pointer 220, a database process 140 ensures that upon successfully becoming the head database object 165, the database object 165 correctly points to its next sibling in its chain 160. That is, by setting a database object 165's next pointer 212 before inserting that database object 165 in chain 160, it may be guaranteed that chain 160 can be traversed from the head end to the tail end.

After setting database object 165C's next pointer 212 to point to database object 165A, that is, the previously identified head of chain 160, in various embodiments, database process 140 attempts to update head pointer 220 to point to database object 165C. Database process 140 may perform an atomic CAS operation in which the head database object 165 previously identified by database process 140 (which is database object 165A in the illustrated example) is compared with the current head database object 165 identified by head pointer 220. A mismatch between those database objects 165 indicates that another database process 140 successfully performed an atomic CAS operation to update head pointer 220 to point to another database object 165 being inserted by that database process 140. For example, head pointer 220 may be updated to point to database object 165D. Because the next pointer 212 of database object 165C would be pointing to database object 165A and not database object 165D (the new head database object in this example), in various embodiments, database process 140 reads the head database object 165 again using head pointer 220 and sets the next pointer 212 of database object 165C to point to the head database object 165D. Database process 140 may then attempt the atomic CAS operation again to update head pointer 220. If there is match, then head pointer 220 is updated by database process 140 to point to database object 165C. The comparison and updating of head pointer 220 can be performed as an atomic operation. Once head pointer 220 has been set to database object 165C, database process 140 may update the previous pointer 214 of the prior head database object 165 to point to database object 165C. As discussed in more detail with respect to FIG. 5, if chain 160 was empty prior to the insertion of a database object 165, then database process 140 may update both head pointer 220 and tail pointer 230 to point to that database object 165 instead of updating a previous pointer 214.

Figure 5:
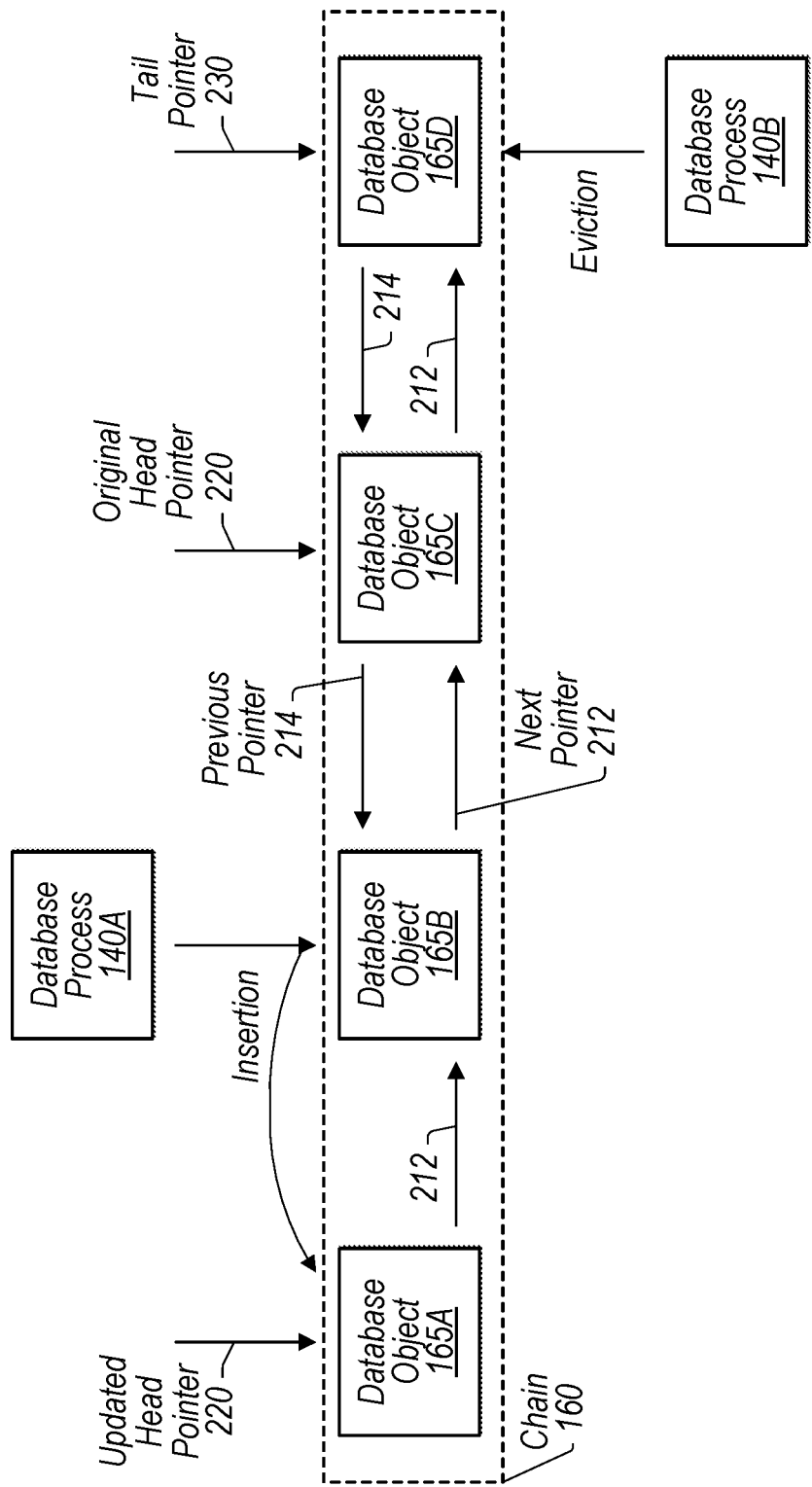
FIG. 5 is a block diagram illustrating an example interaction in which a database process performs an insertion operation on a chain and another database process performs an eviction operation concurrently on the same chain, according to some embodiments.

Turning now to FIG. 5, a block diagram of an example interaction in which a database process 140 performs an insertion operation on a chain 160 and another database process 140 performs an eviction operation concurrently on the same chain 160 is shown. In the illustrated embodiment, there are two database processes 140A-B and a chain 160 having database objects 165A-D. As further shown, chain 160 includes head pointer 220 originally pointing at database object 160C and tail pointer 230 that points at database object 165D.

In many cases, adding and evicting database objects 165 affects two disjoint subsets of the database objects 165 of chain 160. In particular, adding new database objects 165 involves modifying head pointer 220 and not tail pointer 230 in most cases. In some cases, such as when chain 160 is empty, adding a new database object 165 may involve modifying tail pointer 230. For cases in which chain 160 is not empty or has more than one database object 165, evictions may be performed independent of adding database objects 165 if the evicting database process 140 does not modify the database object 165 pointed at by head pointer 220. Accordingly, in some embodiments, when database process 140B seeks to evict database objects 165, database process 140B performs an atomic operation to obtain the current head database object 165. In the illustrated embodiment, head pointer 220 originally identifies database object 165C when database process 140B performs the atomic operation and thus database object 165C serves as the saved head database object 165 for database process 140B. The saved head database object 165, in various embodiments, serves as a stopping point for the evicting database process 140. Consequently, database process 140B may evict database objects 165 beginning from the tail of chain 160 up to the saved head database object 165. In the illustrated embodiment, database process 140 evicts database object 165D as database object 165C is the saved head object 165. In some cases, the saved head database object 165 is also evicted. While database process 140B is evicting, database process 140A inserts database objects 165A-B and updates head pointer 220 to point to database object 165A. Because database process 140B may evict only up to the saved head database object 165, for the illustrated chain 160, database processes 140A-B can modify chain 160 concurrently as they modify disjointed portions of chain 160.

For cases in which chain 160 is empty, an inserting database process 140 may set both head pointer 220 and tail pointer 230. In particular, as mentioned, an inserting database process 140 may perform an atomic operation to access the head database object 165 using head pointer 220 and atomically update head pointer 220 to point to the database object 165 being inserted. In response to determining that no head database object 165 was returned, indicating that head pointer 220 is null and chain 160 is empty, the inserting database process 140 may atomically update tail pointer 230 to point to that database object 165. Since chain 160 is originally empty in that example, the updating of tail pointer 230 by the inserting database process 140 does not conflict with an evicting database process 140. In particular, prior to updating tail pointer 230 by an inserting database process 140, in some embodiments, an evicting database process 140 detects that tail pointer 230 does not point to a database object 165 and thus does not perform eviction on that chain 160 in response. As a result, the evicting database process 140 may not conflict with the inserting database process 140. If chain 160 is not empty, in various embodiments, the inserting database process 140 atomically updates the previous pointer 214 of the newly added database object 165 instead of atomically updating tail pointer 230.

In some cases, the updating of the previous pointer 214 of a given database object 165 may take a reasonable amount of time to occur. As a result, when an evicting database process 140 is evicting database objects 165, the evicting database process 140 may access a database object 165 that has a null previous pointer 214 that has not yet been set by the inserting process 140 that is inserting a new database object 165 preceding the previously identified head database object 165. Since the previous pointer 214 has not been set, the evicting database process 140 may not be able to proceed beyond that database object 165. Thus, in various embodiments, a database object 165 that includes a null previous pointer 214 can serve as a termination point for an eviction procedure. That is, in addition to the saved head database object 165 discussed previously, a database object 165 having a null previous pointer 214 may also serve as a stopping point for an evicting database process 140.

When chain 160 includes a single database object 165, a race condition might occur in which an inserting database process 140 and an evicting database process 140 both attempt to set head pointer 220 and tail pointer 230 concurrently. To address this race condition, in various embodiments, a set of atomic CAS-based operations are performed by database processes 140. As mentioned, when performing evictions, an evicting database process 140 may initially set the eviction flag 310 of chain 160 to a non-default value (e.g., the process identifier 320 of that process 140). The evicting database process 140 may thereafter access the tail database object 165 pointed at by tail pointer 230. If no tail database object 165 is accessed because tail pointer 230 is null, however, then the evicting database process 140 may set the eviction flag 310 back to its original value and exit the eviction procedure on this chain 160.

If the evicting database process 140 successfully accesses the tail database object 165, then the evicting database process 140 may attempt to access the head database object 165. In various embodiments, the evicting process 140 performs an atomic CAS-based operation in which 1) head pointer 220 is set to null if head pointer 220 points to the database object 165 previously accessed via tail pointer 230 and 2) returns the head database object 165 if the first part completes successfully. But if head pointer 220 points to another database object 165, then the evicting database process 140 may not set head pointer 220 to null as a new database object 165 would have been added to chain 160 and thus it would no longer include only the database object 165 being evicted. That is, a mismatch between the previously accessed head database object 165 and the current head database object 165 indicates that an inserting database process 140 inserted the current head database object 165. As a result, chain 160 will include a database object 165 even after the evicting database process 140 evicts its database object 165 and thus head pointer 220 is not set to null, in various embodiments.

The evicting database process 140 may then compare the previously accessed head and tail database objects 165. If the head database object 165 matches the tail database object 165, in various embodiments, the evicting database process 140 performs an atomic CAS operation in which tail pointer 230 is set to null if tail pointer 230 points at the previously accessed tail database object 165. The evicting database process 140 may thereafter set the eviction flag 310 back to its original value and exit the eviction procedure. If that tail pointer 230 does not point at the tail database object 165 previously accessed by the evicting database process 140, then an inserting database process 140 detected that head pointer 220 was null (as set by the evicting process 140 discussed above) when inserting a database object 165 and thus modified both head pointer 220 and tail pointer 230 of chain 160 to point at the database object 165 that is being added by the inserting database process 140. As a result, the evicting database process 140 may not set tail pointer 230 to null as chain 160 will no longer be empty after the evicting database process 140 evicts its database object 165.

Figure 6:
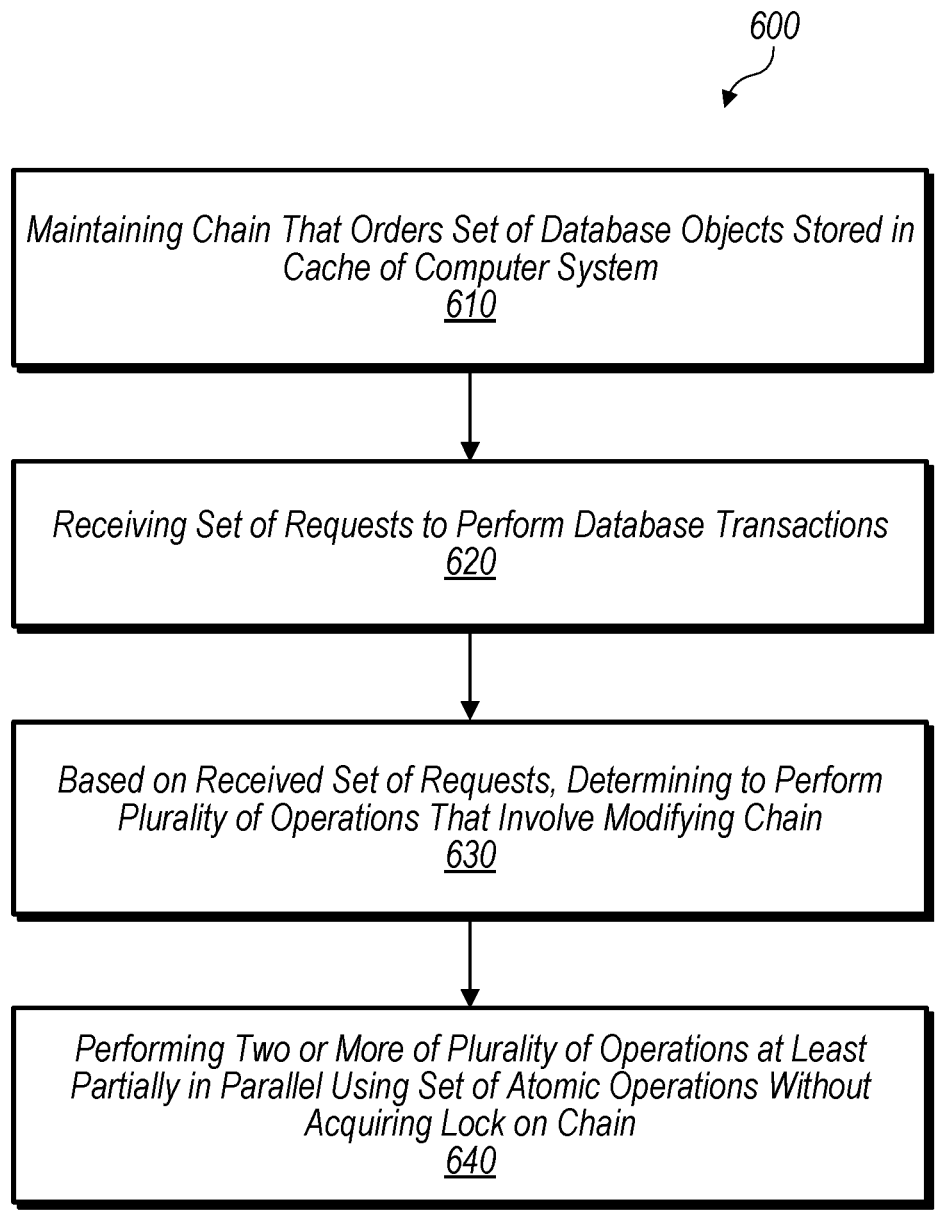
FIGS. 6 and 7 are flow diagrams illustrating example methods that relate to performing multiple operations on a chain at least partially in parallel without acquiring a lock on the chain, according to some embodiments.

Turning now to FIG. 6, a flow diagram of a method 600 is shown. Method 600 is one embodiment of a method that is performed by a computer system (e.g., database node 130) that involves performing multiple operations (e.g., insertion and eviction) on a chain (e.g., a chain 160) at least partially in parallel without acquiring a lock on the chain. In various embodiments, method 600 may be performed by executing program instructions stored on a non-transitory computer-readable storage medium. In some embodiments, method 600 includes more or less steps than shown. For example, method 600 may include a step in which a definition of a query plan or function is compiled into an executable form that is stored as a database object.

Method 600 begins in step 610 with a computer system maintaining a chain that orders a set of database objects (e.g., database objects 165) stored in a cache (e.g., cache 150) of the computer system. In various embodiments, the cache is shared among a plurality of processes (e.g., database processes 140) executing on the computer system. Those database objects may be usable to affect a performance of the transactions against a database (e.g., database 110).

In step 620, the computer system receives a set of requests (e.g., from application node 120) to perform database transactions. In step 630, based on those received set of requests, the computer system determines to perform a plurality of operations that involve modifying the chain. Two or more of those operations may be performed by at least two different processes of the plurality of processes.

In step 640, the computer system performs two or more of the plurality of operations at least partially in parallel using a set of atomic operations without acquiring a lock on the chain. In various cases, one of the two or more operations is an insertion operation. Performing the insertion operation may include a process of the computer system identifying, from a head pointer (e.g., a head pointer 220) of the chain, a head database object at a head end of the chain. The process may set a pointer (e.g., a next pointer 212) of the database object to point to the head database object. The process may then perform a comparison between the head database object and a current head database object pointed at by the head pointer. In response to the comparison indicating that the head database object matches the current head database object, the process may update the head pointer to point to the database object. The comparison and the updating of the head pointer may be performed as a single atomic operation (e.g., a CAS operation). In response to an unsuccessful performance of the atomic operation, the process may re-perform the identifying and the setting. In response to detecting that the head pointer indicated an empty chain, the process may perform an atomic update operation to update a tail pointer (e.g., a tail pointer 230) of the chain to point to the database object.

In various cases, one of the two or more operations is an eviction operation. Performing the eviction operation may include a first process performing a comparison between an eviction identifier (e.g., an eviction flag 310 of a chain 160) and a default value (e.g., zero). In response to the comparison indicating that a relationship between the eviction identifier and the default value satisfies a particular criteria (e.g., the value of the eviction identifier matches the default value), the first process may then update the eviction identifier to a different value (e.g., the value of the process identifier 320 of that first process). In various embodiments, the updated eviction identifier prevents other processes from performing eviction operations on the chain while the eviction identifier specifies the different value. The comparison and the updating of the eviction identifier are performed as a single atomic operation (e.g., a CAS operation). The computers system may perform another eviction operation using a second process and the other eviction operation may include the second process detecting that the eviction identifier does not specify the default value. In response, the second process may identify another chain that orders a set of a different type of database object stored in the cache of the computer system and perform the other eviction operation on that chain. Performing an eviction operation may include identifying, from a head pointer of the chain, a head database object at the head end of the chain and, beginning from the tail database object pointed at by the tail pointer of the chain, evicting, from the cache, database objects up to the identified head database object.

Performing an eviction operation may include identifying, from the head pointer of the chain, a head database object at a head end of the chain and identifying, from the tail pointer of the chain, a tail database object at a tail end of the chain. In response to detecting that the head database object matches the tail database object, a process may set the head pointer to indicate an empty chain. The identifying of the head database object and the setting of the head pointer may be performed as an atomic operation. The eviction operation may be performed in response to detecting that an available capacity of the cache satisfies a fullness threshold.

Figure 7:
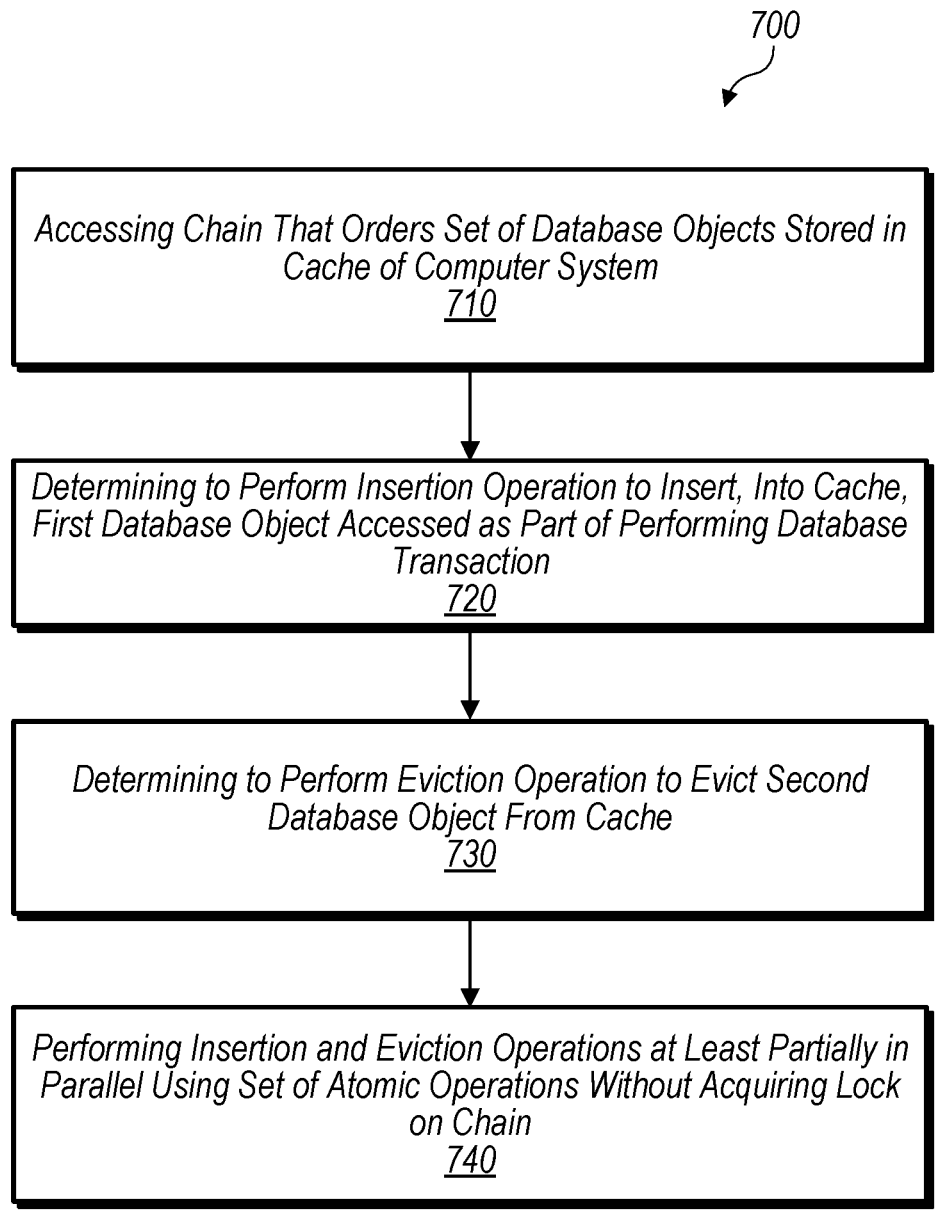

Turning now to FIG. 7, a flow diagram of a method 700 is shown. Method 700 is one embodiment of a method that is performed by a computer system (e.g., database node 130) that involves performing multiple operations (e.g., insertion and eviction) on a chain (e.g., a chain 160) at least partially in parallel without acquiring a lock on the chain. In various embodiments, method 700 may be performed by executing program instructions stored on a non-transitory computer-readable storage medium. In some embodiments, method 700 includes more or less steps than shown. For example, method 700 may include a step in which a definition of a query plan or function is compiled into an executable form that is stored as a database object.

Method 700 begins in step 710 with a computer system accessing a chain that orders a set of database objects (e.g., database objects 165) stored in a cache (e.g., cache 150) of the computer system. In step 720, the computer system determines to perform an insertion operation to insert, into the cache, a first database object accessed as part of performing a database transaction. In step 730, the computer system determines to perform an eviction operation to evict a second database object from the cache. Determining to perform the eviction operation may be in response to detecting that the available capacity of the cache does not satisfy (e.g., is below) a capacity threshold. The insertion and eviction operations may include modifying the chain.

In step 740, the computer system performs the insertion and eviction operations at least partially in parallel using a set of atomic operations without acquiring a lock on the chain. Performing the eviction operation may include identifying, from a head pointer (e.g., a head pointer 220) of the chain, a head database object at a head end of the chain and evicting, from the cache, those database objects that are between the head database object and a tail database object identified by a tail pointer (e.g., a tail pointer 230) of the chain. Performing the eviction operation may include a first process of the system performing an atomic operation to update an eviction identifier to a different value in response to detecting that the eviction identifier matches a default value. In various embodiments, the updated eviction identifier prevents other processes from performing eviction operations on the chain while the eviction identifier specifies the different value. Performing the insertion operation may include identifying, from the head pointer of the chain, a head database object at a head end of the chain, setting a pointer of the first database object to point to the head database object, and then performing an atomic operation in which the head pointer of the chain is updated to point to the first database object in response to detecting that the identified head database object matches a current head database object pointed at by the head pointer.

Various passages of the present disclosure are embodied in the example code presented below with additional comments added.

```
addEntry(chain, entry) {
  entry->prev = NULL
  loop
    //In this loop, the CAS operation is performed unit it can successfully
    //replace the chain->head pointer with the new entry, with the
    //guarantee that the chain->head pointer is pointing to the latest entry
    //at the beginning of the chain. Once the CAS operation is successful,
    //the new entry is now at the beginning of the chain.
    head = atomicRead(chain->head)
    //The next pointer is set here to ensure that once the CAS( ) operation
    //below succeeds, the newly-added entry's next pointer is pointing to
    the correct sibling
    atomicSet(entry->next, head)
    if CAS(chain->head, head, entry) if successful then
      break
    end if
  end loop
```

-continued

```
    if head is NIL then
        //If head is NIL, it means that this process is adding the first entry to
        //an empty chain. Thus the chain->tail pointer is updated to point to
the new entry.
        atomicSet(chain->tail, entry)
    else
        atomicSet(head->prev, entry)
    end if
}
evictEntry(chain, entry) {
    //In this procedure, the eviction process does not interact with the
    //chain->head pointer. This process can safely update the chain->tail
    //pointer, if the entry is the tail. If the entry is not the tail, then the
    //sibling entries to the entry that's being evicted are connected.
    prev_entry = entry->prev
    next_entry = entry->next
    prev_entry->next = next_entry
    if entry is chain->tail then
        chain->tail = prev_entry
    else
        next_entry->prev = prev_entry
    end if
}
evictChain(chain) {
    if CAS (chain->evictor, 0, getpid( )) is NOT successful then
        return
    end if
    //Termine if the chain is empty
    tail_entry = atomicRead(chain->tail)
    if tail_entry is NIL then
        atomicSet(chain->evictor, 0)
        return
    end if
    //Obtain the current head position of the chain. The CASVal operation
    //sets the chain->head to NIL if the entry to be removed is also the tail.
    head_entry = CASVal(chain->head, tail_entry, NIL)
    if head_entry is tail_entry then
        //When the removed entry is the only entry present in the chain, set
        //the chain->tail pointer to NIL, only if this pointer has not been
        //changed by addEntry( ) called by another process.
        CAS(chain->tail, tail_entry, NIL)
        atomicSet(chain->evictor, 0)
        return
    end if
    loop
        prev_entry = atomicRead(tail_entry->prev)
        if prev_entry is NIL then
            //If the prev pointer is NIL, this could mean that either the entry is
            //currently the head, or it was the head at some point in the past,
            //but the prev pointer has not yet been established by the process
            //that had since added new entries before this old head entry. In
            //either case, eviction terminates immediately.
            break
        end if
        evictEntry(chain, tail_entry)
        if prev_entry is head_entry then
            //If the previous entry is the head that was seen earlier, eviction
can
            //be stopped after evicting the current entry.
            break
        end if
        tail_entry = prev_entry
    end loop
    atomicSet(chain->evictor, 0)
}
```

Exemplary Multi-Tenant Database System

Figure 8:
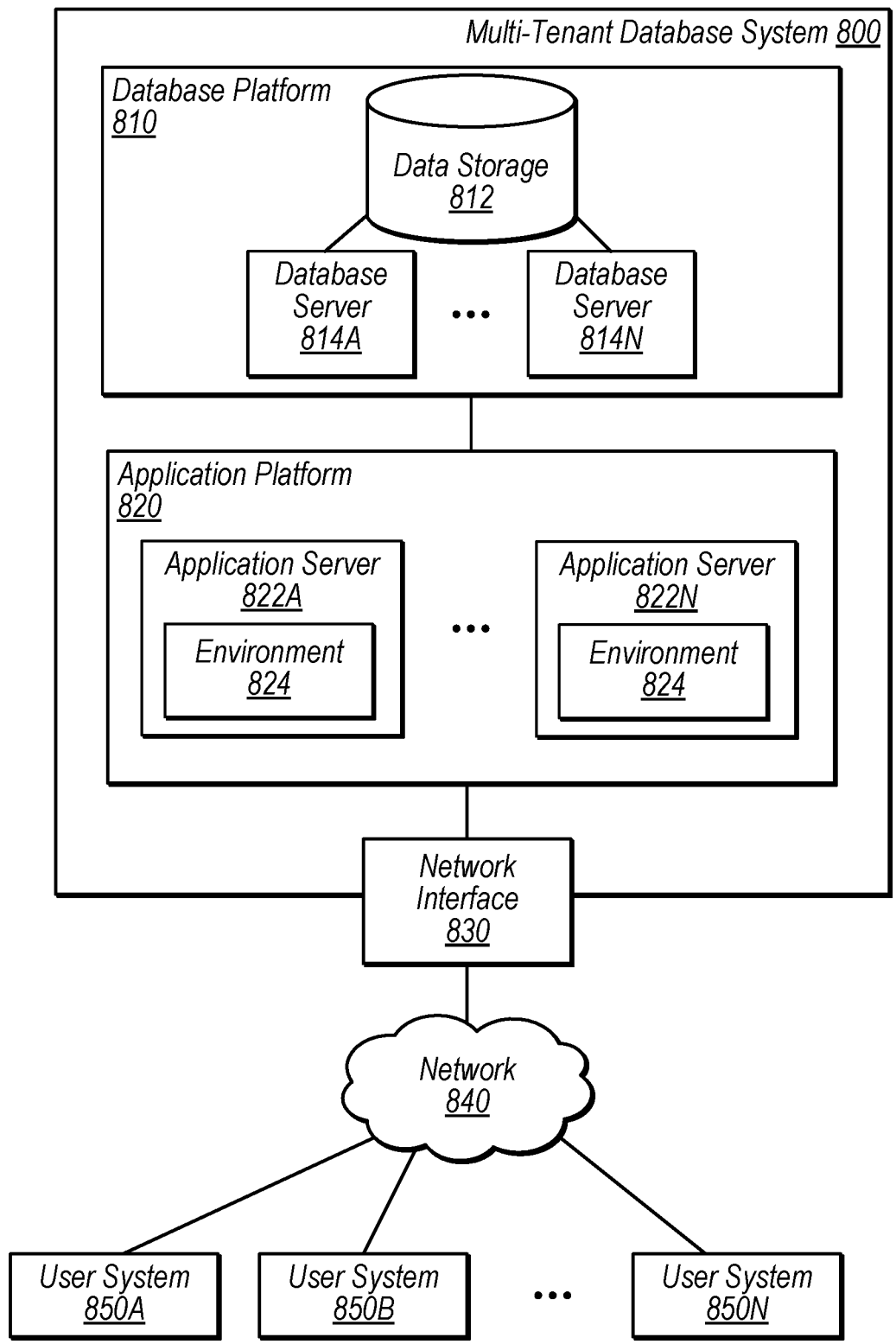
FIG. 8 is a block diagram illustrating elements of a multi-tenant system, according to some embodiments.

Turning now to FIG. 8, an exemplary multi-tenant database system (MTS) 800 in which various techniques of the present disclosure can be implemented is shown—e.g., system 100 may be MTS 800. In FIG. 8, MTS 800 includes a database platform 810, an application platform 820, and a network interface 830 connected to a network 840. Also as shown, database platform 810 includes a data storage 812 and a set of database servers 814A-N that interact with data storage 812, and application platform 820 includes a set of application servers 822A-N having respective environments 824. In the illustrated embodiment, MTS 800 is connected to various user systems 850A-N through network 840. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 800, in various embodiments, is a set of computer systems that together provide various services to users (alternatively referred to as "tenants") that interact with MTS 800. In some embodiments, MTS 800 implements a customer relationship management (CRM) system that provides mechanism for tenants (e.g., companies, government bodies, etc.) to manage their relationships and interactions with customers and potential customers. For example, MTS 800 might enable tenants to store customer contact information (e.g., a customer's website, email address, telephone number, and social media data), identify sales opportunities, record service issues, and manage marketing campaigns. Furthermore, MTS 800 may enable those tenants to identify how customers have been communicated with, what the customers have bought, when the customers last purchased items, and what the customers paid. To provide the services of a CRM system and/or other services, as shown, MTS 800 includes a database platform 810 and an application platform 820.

Database platform 810, in various embodiments, is a combination of hardware elements and software routines that implement database services for storing and managing data of MTS 800, including tenant data. As shown, database platform 810 includes data storage 812. Data storage 812, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 812 is used to implement a database (e.g., database 110) comprising a collection of information that is organized in a way that allows for access, storage, and manipulation of the information. Data storage 812 may implement a single database, a distributed database, a collection of distributed databases, a database with redundant online or offline backups or other redundancies, etc. As part of implementing the database, data storage 812 may store files that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 800 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 812 is organized as part of a log-structured merge-tree (LSM tree). An LSM tree normally includes two high-level components: an in-memory buffer and a persistent storage. In operation, a database server 814 may initially write database records into a local in-memory buffer before later flushing those records to the persistent storage (e.g., data storage 812). As part of flushing database records, the database server 814 may write the database records into new files that are included in a "top" level of the LSM tree. Over time, the database records may be rewritten by database servers 814 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 812.

When a database server 814 wishes to access a database record for a particular key, the database server 814 may traverse the different levels of the LSM tree for files that potentially include a database record for that particular key. If the database server 814 determines that a file may include a relevant database record, the database server 814 may fetch the file from data storage 812 into a memory of the database server 814. The database server 814 may then check the fetched file for a database record having the particular key. In various embodiments, database records are immutable once written to data storage 812. Accordingly, if the database server 814 wishes to modify the value of a row of a table (which may be identified from the accessed database record), the database server 814 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 814, in various embodiments, are hardware elements, software routines, or a combination thereof capable of providing database services, such as data storage, data retrieval, and/or data manipulation. A database server 814 may correspond to database node 130. Such database services may be provided by database servers 814 to components (e.g., application servers 822) within MTS 800 and to components external to MTS 800. As an example, a database server 814 may receive a database transaction request from an application server 822 that is requesting data to be written to or read from data storage 812. The database transaction request may specify an SQL SELECT command to select one or more rows from one or more database tables. The contents of a row may be defined in a database record and thus database server 814 may locate and return one or more database records that correspond to the selected one or more table rows. In various cases, the database transaction request may instruct database server 814 to write one or more database records for the LSM tree-database servers 814 maintain the LSM tree implemented on database platform 810. In some embodiments, database servers 814 implement a relational database management system (RDMS) or object oriented database management system (OODBMS) that facilitates storage and retrieval of information against data storage 812. In various cases, database servers 814 may communicate with each other to facilitate the processing of transactions. For example, database server 814A may communicate with database server 814N to determine if database server 814N has written a database record into its in-memory buffer for a particular key.

Application platform 820, in various embodiments, is a combination of hardware elements and software routines that implement and execute CRM software applications as well as provide related data, code, forms, web pages and other information to and from user systems 850 and store related data, objects, web page content, and other tenant information via database platform 810. In order to facilitate these services, in various embodiments, application platform 820 communicates with database platform 810 to store, access, and manipulate data. In some instances, application platform 820 may communicate with database platform 810 via different network connections. For example, one application server 822 may be coupled via a local area network and another application server 822 may be coupled via a direct network link. Transfer Control Protocol and Internet Protocol (TCP/IP) are exemplary protocols for communicating between application platform 820 and database platform 810, however, it will be apparent to those skilled in the art that other transport protocols may be used depending on the network interconnect used.

Application servers 822, in various embodiments, are hardware elements, software routines, or a combination thereof capable of providing services of application platform 820, including processing requests received from tenants of MTS 800. Application servers 822, in various embodiments, can spawn environments 824 that are usable for various purposes, such as providing functionality for developers to develop, execute, and manage applications (e.g., business logic). Data may be transferred into an environment 824 from another environment 824 and/or from database platform 810. In some cases, environments 824 cannot access data from other environments 824 unless such data is expressly shared. In some embodiments, multiple environments 824 can be associated with a single tenant.

Application platform 820 may provide user systems 850 access to multiple, different hosted (standard and/or custom) applications, including a CRM application and/or applications developed by tenants. In various embodiments, application platform 820 may manage creation of the applications, testing of the applications, storage of the applications into database objects at data storage 812, execution of the applications in an environment 824 (e.g., a virtual machine of a process space), or any combination thereof. In some embodiments, application platform 820 may add and remove application servers 822 from a server pool at any time for any reason, there may be no server affinity for a user and/or organization to a specific application server 822. In some embodiments, an interface system (not shown) implementing a load balancing function (e.g., an F5 Big-IP load balancer) is located between the application servers 822 and the user systems 850 and is configured to distribute requests to the application servers 822. In some embodiments, the load balancer uses a least connections algorithm to route user requests to the application servers 822. Other examples of load balancing algorithms, such as are round robin and observed response time, also can be used. For example, in certain embodiments, three consecutive requests from the same user could hit three different servers 822, and three requests from different users could hit the same server 822.

In some embodiments, MTS 800 provides security mechanisms, such as encryption, to keep each tenant's data separate unless the data is shared. If more than one server 814 or 822 is used, they may be located in close proximity to one another (e.g., in a server farm located in a single building or campus), or they may be distributed at locations remote from one another (e.g., one or more servers 814 located in city A and one or more servers 822 located in city B). Accordingly, MTS 800 may include one or more logically and/or physically connected servers distributed locally or across one or more geographic locations.

One or more users (e.g., via user systems 850) may interact with MTS 800 via network 840. User system 850 may correspond to, for example, a tenant of MTS 800, a provider (e.g., an administrator) of MTS 800, or a third party. Each user system 850 may be a desktop personal computer, workstation, laptop, PDA, cell phone, or any Wireless Access Protocol (WAP) enabled device or any other computing device capable of interfacing directly or indirectly to the Internet or other network connection. User system 850 may include dedicated hardware configured to interface with MTS 800 over network 840. User system 850 may execute a graphical user interface (GUI) corresponding to MTS 800, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 850 to access, process, and view information and pages available to it from MTS 800 over network 840. Each user system 850 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 800 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 850 may be users in differing capacities, the capacity of a particular user system 850 might be determined one or more permission levels associated with the current user. For example, when a salesperson is using a particular user system 850 to interact with MTS 800, that user system 850 may have capacities (e.g., user privileges) allotted to that salesperson. But when an administrator is using the same user system 850 to interact with MTS 800, the user system 850 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 800 that are allocated at the tenant level while other data structures are managed at the user level.

In some embodiments, a user system 850 and its components are configurable using applications, such as a browser, that include computer code executable on one or more processing elements. Similarly, in some embodiments, MTS 800 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 840 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 850 may communicate with MTS 800 using TCP/IP and, at a higher network level, use other common Internet protocols to communicate, such as HTTP, FTP, AFS, WAP, etc. For example, where HTTP is used, user system 850 might include an HTTP client commonly referred to as a "browser" for sending and receiving HTTP messages from an HTTP server at MTS 800. Such a server might be implemented as the sole network interface between MTS 800 and network 840, but other techniques might be used as well or instead. In some implementations, the interface between MTS 800 and network 840 includes load sharing functionality, such as round-robin HTTP request distributors to balance loads and distribute incoming HTTP requests evenly over a plurality of servers.

In various embodiments, user systems 850 communicate with application servers 822 to request and update system-level and tenant-level data from MTS 800 that may require one or more queries to data storage 812. In some embodiments, MTS 800 automatically generates one or more SQL statements (the SQL query) designed to access the desired information. In some cases, user systems 850 may generate requests having a specific format corresponding to at least a portion of MTS 800. As an example, user systems 850 may request to move data objects into a particular environment 824 using an object notation that describes an object relationship mapping (e.g., a JavaScript object notation mapping) of the specified plurality of objects.

Exemplary Computer System

Figure 9:
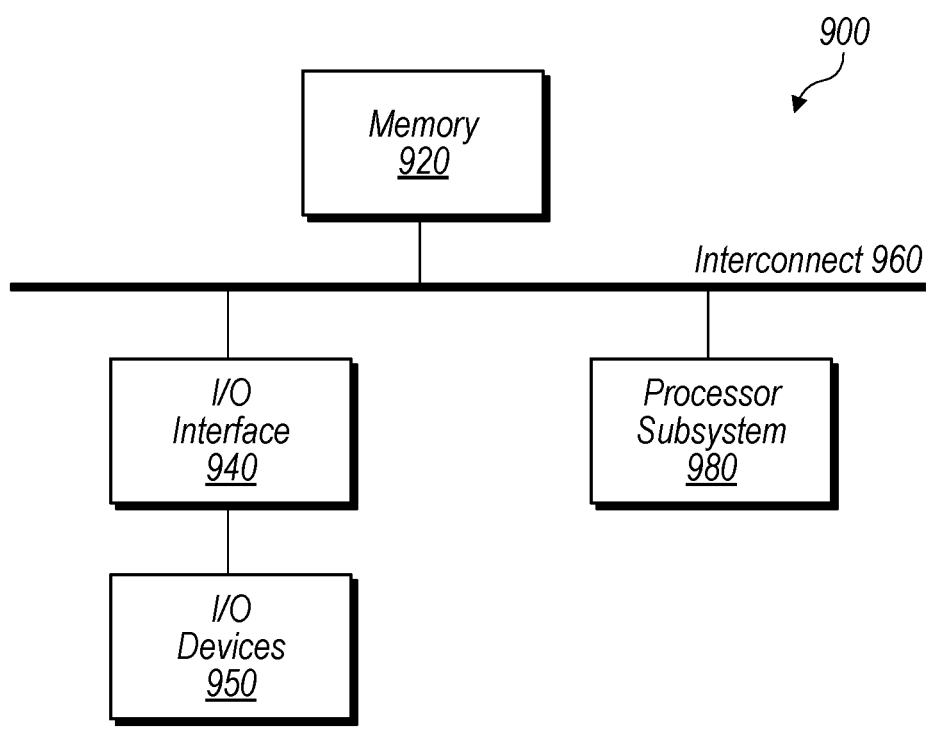
FIG. 9 is a block diagram illustrating elements of a computer system for implementing various systems described in the present disclosure, according to some embodiments.

Turning now to FIG. 9, a block diagram of an exemplary computer system 900, which may implement system 100, database 110, application node 120, database node 130, MTS 800, and/or user system 850, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, program instructions that when executed implement database services of database node 130 may be included/stored within system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

What is claimed is:

1. A method, comprising:
    maintaining, by a computer system, a chain structure that links and orders a set of database objects stored in a cache of the computer system, wherein the set of database objects is usable to affect a performance of database transactions against a database;
    receiving, by the computer system, a transaction request to perform a database transaction with respect to the database;
    as part of performing the database transaction, the computer system determining to perform a first eviction operation to remove a particular set of database objects from the chain structure; and
    performing, by the computer system, the first eviction operation, wherein the performing of the first eviction operation includes a first process of the computer system:
        performing a comparison between an eviction identifier and a particular value; and
        in response to the comparison indicating that a relationship between the eviction identifier and the particular value satisfies a particular criteria, updating the eviction identifier to a different value, wherein the updated eviction identifier prevents other processes from performing eviction operations on the chain structure while the eviction identifier specifies the different value;

after the updating of the eviction identifier, evicting the particular set of database objects from the chain structure; and after the evicting, updating the eviction identifier to the particular value to permit other processes to perform eviction operations on the chain structure.

2. The method of claim 1, wherein the comparison and the updating of the eviction identifier to the different value are performed together as an atomic operation.

3. The method of claim 1, further comprising:

performing, by the computer system, a second eviction operation using a second process of the computer system, wherein performing the second eviction operation includes the second process:

detecting that the eviction identifier does not specify the particular value;

in response to the detecting, identifying another chain structure that orders a set of a different type of database object stored in the cache; and performing the second eviction operation on the identified chain structure.

4. The method of claim 1, wherein the evicting of the particular set of database objects includes:

identifying, from a head pointer of the chain structure, a head database object at a head end of the chain structure; and starting from a tail database object that is pointed at by a tail pointer of the chain structure, evicting, from the cache, database objects up to, but not including, the head database object.

5. The method of claim 1, wherein performing the first eviction operation includes:

identifying, from a head pointer of the chain structure, a head database object at a head end of the chain structure;

identifying, from a tail pointer of the chain structure, a tail database object at a tail end of the chain structure; and in response to determining that the identified head database object matches the identified tail database object, setting the head pointer to indicate an empty chain structure.

6. The method of claim 5, wherein the identifying of the head database object and the setting of the head pointer are performed together as an atomic operation.

7. The method of claim 5, wherein performing the first eviction operation includes:

subsequent to setting the head pointer and in response to determining that the identified tail database object matches a current tail database object pointed at by the tail pointer, setting the tail pointer to indicate an empty chain structure; and evicting the tail database object from the cache.

8. The method of claim 1, further comprising:

performing, by the computer system, an insertion operation to insert a database object into the chain structure, wherein performing the insertion operation includes a second process of the computer system:

identifying, from a head pointer of the chain structure, a head database object at a head end of the chain structure;

setting a pointer of the database object to point to the head database object;

performing a different comparison between the head database object and a current head database object pointed at by the head pointer; and in response to the different comparison indicating that the head database object matches the current head database object, updating the head pointer to point to the database object, wherein the different comparison and the updating of the head pointer are performed together as an atomic operation.

9. The method of claim 1, wherein the first eviction operation is performed without acquiring a lock on the chain structure.

10. A non-transitory computer-readable medium having program instructions stored thereon that are capable of causing a computer system to perform operations comprising:

maintaining a chain structure that links and orders a set of database objects stored in a cache of the computer system, wherein the set of database objects is usable to affect a performance of database transactions against a database;

determining to perform a first eviction operation to remove a particular set of database objects from the chain structure; and performing the first eviction operation using a first process, wherein the performing of the first eviction operation includes the first process:

performing a comparison between an eviction identifier and a particular value; and in response to the comparison indicating that a relationship between the eviction identifier and the particular value satisfies a particular criteria, updating the eviction identifier to a different value, wherein the updated eviction identifier prevents other processes from performing eviction operations on the chain structure while the eviction identifier specifies the different value;

after the updating of the eviction identifier, evicting the particular set of database objects from the chain structure; and after the evicting, updating the eviction identifier to the particular value to permit other processes to perform eviction operations on the chain structure.

11. The non-transitory computer-readable medium of claim 10, wherein the operations further comprise:

performing a second eviction operation using a second process, wherein the performing of the second eviction operation includes the second process:

detecting that the eviction identifier does not specify the particular value; and in response to the detecting, ceasing to perform the second eviction operation.

12. The non-transitory computer-readable medium of claim 10, wherein the evicting of the particular set of database objects includes:

evicting, from the cache, database objects from a tail database object pointed at by a tail pointer of the chain structure up to a database object that does not include a pointer to a database object that has not been evicted.

13. The non-transitory computer-readable medium of claim 10, wherein the first eviction operation is performed in response to determining that an available capacity of the cache satisfies a fullness threshold.

14. The non-transitory computer-readable medium of claim 10, wherein the operations further comprise:

performing an insertion operation to insert a set of database objects into the chain structure, wherein the first eviction operation and the insertion operation are performed in parallel without acquiring a lock on the chain structure.

15. A system, comprising:

at least one processor; and memory having program instructions stored thereon that are executable by the at least one processor to cause the system to perform operations comprising:

maintaining a chain structure that links and orders a set of database objects stored in a cache of the system, wherein the set of database objects is usable to affect a performance of database transactions against a database;

determining to perform a first eviction operation to remove a particular set of database objects from the chain structure; and performing the first eviction operation using a first process, wherein the performing of the first eviction operation includes the first process:

performing a comparison between an eviction identifier and a particular value; and in response to the comparison indicating that a relationship between the eviction identifier and the particular value satisfies a particular criteria, updating the eviction identifier to a different value, wherein the updated eviction identifier prevents other processes from performing eviction operations on the chain structure while the eviction identifier specifies the different value;

after the updating of the eviction identifier, evicting the particular set of database objects from the chain structure; and after the evicting, updating the eviction identifier to the particular value to permit other processes to perform eviction operations on the chain structure.

16. The system of claim 15, wherein the evicting of the particular set of database objects includes:

identifying, from a head pointer of the chain structure, a head database object at a head end of the chain structure; and evicting, from the cache, those database objects that are between the head database object and a tail database object identified by a tail pointer of the chain structure.

17. The system of claim 15, wherein the operations further comprise:

performing a second eviction operation using a second process, wherein the performing of the second eviction operation includes the second process:

detecting that the eviction identifier does not specify the particular value;

in response to the detecting, identifying another chain structure that orders a set of a different type of database object stored in the cache of the system; and performing the second eviction operation on the identified chain structure.

18. The system of claim 15, wherein the operations further comprise:

performing an insertion operation to insert a set of database objects into the chain structure, wherein the first eviction operation and the insertion operation are performed in parallel without acquiring a lock on the chain structure.

19. The system of claim 15, wherein the first eviction operation is performed in response to determining that an available capacity of the cache satisfies a fullness threshold.

* * * * *